Patented Aug. 28, 1934

1,971,393

UNITED STATES PATENT OFFICE 1,971,393

BROMINE SUBSTITUTED ALLYLESTER OF 2 - PHENYLQUINOLINE - 4 - CARBOXYLIC ACID

Walter G. Christiansen, Bloomfield, and Raymond Van Winkle, Passaic, N. J., assignors to E. R. Squibb & Sons, Brooklyn, N. Y., a corporation of New York No Drawing. Application June 15, 1931, Serial No. 544,686

8 Claims. (Cl. 260—39)

This invention relates to products having therapeutic properties and particularly to bromine substituted allylesters of 2-phenylquinoline-4-carboxylic acid and their hydrochlorides and includes the preparation thereof.

The allylesters of 2-phenylquinoline-4-carboxylic acid are known, but the bromine substitution products thereof have not been prepared or described heretofore. We have discovered that these substitution products have valuable antipyretic and analgesic properties and are therefore useful therapeutic agents. The hydrochlorides of the esters have similar properties and are more conveniently isolated.

Although any suitable procedure may be employed in preparing the products the method hereinafter described is satisfactory and will serve as an illustration of the invention.

Example 1

To prepare beta-brom allylester of 2-phenylquinoline-4-carboxylic acid: 50 grams of sodium 2-phenylquinoline-4-carboxylate are added to 50–100 cc. of acetone and heated to boiling on a steam bath in a receptacle provided with a reflux condenser and an agitator. 41.5 grams of 2,3 dibrom propene are added directly and the refluxing of the resulting solution carried out for at least six hours. The acetone is then distilled off at ordinary pressure and the excess 2,3 dibrom propene by heating on a steam bath under 40 mm. vacuum. The resulting oily-solid residue is extracted with an ether-water mixture and the ether portion washed thoroughly with dilute sodium bicarbonate solution followed by distilled water. The resulting ether solution is filtered, dried over anhydrous sodium sulfate and after removing the latter, the ether evaporated off. A reddish-yellow oil is obtained which undergoes decomposition when heated below its boiling point under vacuum as low as 8 mm. After purification by precipitation as the hydrochloride as hereinafter described, the free base can be obtained by treating the hydrochloride with dilute alkali.

Properties:

Beta-brom allylester of 2 phenylquinoline-4-carboxylic acid. Yellowish-orange oil.

Does not crystallize on chilling or from the following solvents in which it is soluble: alcohol, ether, acetone, acetic acid, and other common organic solvents.

It is insoluble in water.

Composition—$C_{19}H_{14}O_2NBr$

Formula—

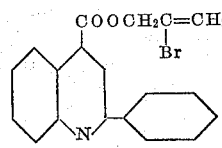

Example 2

To prepare the hydrochloride: Dissolve the base in ether dried over anhydrous sodium sulfate and saturate the resulting solution with dry hydrogen chloride gas. The hydrochloride precipitates out at first as a light yellow soft stringy mass which soon hardens. The ether is removed, the product washed with additional ether and then recrystallized out of a small amount of absolute alcohol.

Properties:

Hydrochloride of beta-brom allylester of 2 phenylquinoline-4-carboxylic acid.

Pale yellow crystalline solid.

Melting point—120–123° C.

Insoluble in ether—readily soluble in hot alcohol.

Water splits the hydrochloride into the ester and hydrochloric acid.

The hydrochloride possesses an acidic taste due to the liberation of the hydrochloric acid.

Composition—$C_{19}H_{15}O_2NClBr$

Formula—

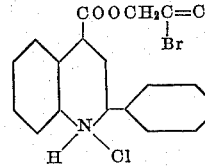

It will be understood that procedures other than those described may be utilized in preparing the products and that various changes may be made in the details of operation without departing from the invention or sacrificing the advantages thereof.

We claim:

1. As a new product the beta-brom allylester of 2-phenylquinoline-4-corboxylic acid.

2. As a new product the hydrochloride of beta-brom allylester of 2-phenylquinoline-4-carboxylic acid.

3. As a new product a beta-brom allylester of 2-phenylquinoline-4-carboxylic acid.

4. The method of preparing bromine-substituted allyl esters of 2-phenyl-quinoline-4-carboxylic acid which comprises heating a salt of 2-phenyl-quinoline-4-carboxylic acid and a bromo propene which contains at least two bromine atoms.

5. The method of preparing a bromine-substituted allylester of 2-phenyl-quinoline-4-carboxylic acid having the formula:

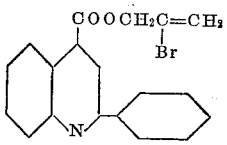

which comprises condensing a salt of 2-phenyl-quinoline-4-carboxylic acid with 2,3 dibrom propene.

6. The method of producing a bromine-substituted allylester of 2-phenyl-quinoline-4-carboxylic acid which comprises heating a salt of 2-phenyl-quinoline-4-carboxylic acid with dibrom propene.

7. The method of preparing bromine-substituted allylesters of 2-phenyl-quinoline-4-carboxylic acid which comprises condensing a salt of 2-phenyl-quinoline-4-carboxylic acid with a bromo propene containing bromine atoms at least in the 2,3 positions.

8. A method of preparing the hydrochloride of the beta-brom allylester of 2-phenyl-quinoline-4-carboxylic acid which comprises condensing the sodium salt of 2-phenyl-quinoline-4-carboxylic acid with 2,3 dibrom propene by heating in an inert solvent, then distilling off the solvent and extracting the ester from the residue and reacting the ester with hydrogen chloride gas to precipitate the hydrochloride.

WALTER G. CHRISTIANSEN.
RAYMOND VAN WINKLE.